United States Patent Office 2,842,594
Patented July 8, 1958

2,842,594
RECLAMATION OF NITROGUANIDINE

Robert Evans, Tullahoma, Tenn., and Francis C. Thames and Sol Skolnik, Indian Head, Md., assignors to the United States of America as represented by the Secretary of the Navy No Drawing. Application August 5, 1953
Serial No. 372,612

4 Claims. (Cl. 260—564)

(Granted under Title 35, U. S. Code (1952), sec. 266)

The invention described herein may be manufactured and used by or for the Government of the United States of America for governmental purposes without the payment of any royalties thereon or therefor.

This invention relates to nitroguanidine, and particularly to increasing the yield of nitroguanidine obtainable by the known nitration process.

In one application of the known process, guanidine sulfate is combined with concentrated nitric and sulfuric acids, to produce nitroguanidine, in accordance with the formula:

$(NH_2)_3CHSO_4 + HNO_3 + H_2SO_4 \longrightarrow$
(guanidine sulfate)
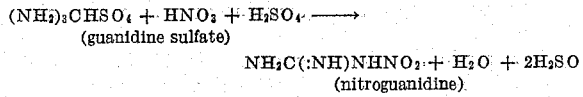
$NH_2C(:NH)NHNO_2 + H_2O + 2H_2SO_4$
(nitroguanidine)

the nitroguanidine being precipitated out of the solution by diluting it with cold water, or by "drowning" it in cold water, or in a mixture of ice and water. The precipitated nitroguanidine is then removed by centrifuging or filtration.

The process just described yields somewhat less than a hundred percent of the guanidine potential of the mixture; that is, a certain percentage of the nitroguanidine does not precipitate. Remaining in solution is an amount that varies, percentage-wise, according to the degree of dilution of the spent sulfuric acid. In addition, the nitration process is not always continued to its theoretical termination point; hence, a certain fraction of the guanidine sulfate remains un-nitrated. This un-nitrated material remains in the spent or diluted acid as a guanidine salt.

Various methods have been proposed for purifying the nitroguanidine obtained by the precipitation method above-described, but nobody heretofore appears to have succeeded in recovering any of the unprecipitated nitroguanidine residual remaining in the spent acid at the conclusion of the nitration cycle. The present invention supplies a solution to this problem of recovering the unprecipitated residual; the solution involving the steps of (1) applying a denitrating and dehydrating technique to the spent sulfuric acid containing the said unprecipitated residual, and (2) reusing the resultant concentrated acid, with its denitrated guanidine constituent, in a succeeding nitration cycle, as an ingredient to be added to a new supply of guanidine sulfate and nitrating acids, to increase the nitroguanidine yield obtainable during the said succeeding run of the cycle.

In the practice of the novel denitrating and dehydrating technique just described, care is exercised to prevent decomposition of the guanidine residual itself during the separation of the nitrate radical therefrom, as such decomposition would be likely to degenerate into a violent hydrolytic action that might release nitrogenous matter with explosive force. Specifically, such decomposition is avoided by maintaining a subatmospheric pressure throughout the denitrating and dehydrating operation, and by dividing the operation into a series of stages each of several hours' duration, during which the temperature is increased very gradually, from a starting temperature of about 50 degrees centigrade to a finishing temperature of about 150 degrees centigrade, and during which the degree of vacuum applied increases from a starting vacuum of 25 to 50 millimeters of mercury to a concluding vacuum of 5 millimeters or less. This subatmospheric pressure technique makes possible the progressive withdrawal of water and nitric acid from the spent sulfuric acid guanidine residual, in successive stages employing gradually and moderately increased heat application, thus eliminating the explosion hazard. The resultant concentration of sulfuric acid and guanidine salts, when added to a succeeding nitration cycle, will increase the nitroguanidine yield for said succeeding cycle by the amount of the guanidine salts thus recycled.

Accordingly, an object of the invention is to provide a novel method of recovering the guanidine residue from the spent, diluted sulfuric acid remaining at the conclusion of a nitroguanidine precipitation cycle. Stated more generically, the invention provides a novel method for increasing the yield obtainable in any nitration process, the said novel method involving the steps of (1) denitrating a residue, and (2) reusing the denitrated residue in a new nitrating cycle.

Another object of the invention is to provide a water content reduction or dehydration process applicable to the dilute acid residual of a nitroguanidine manufacturing operation, the said dehydration process being carried out in such a manner that the nitroguanidine contained in said dilute acid is denitrated as the acid concentration proceeds, so that the resultant concentrated acid, with its denitrated guanidine component along with any other un-nitrated guanidine salts entrained therewith, may be employed in a new nitrating cycle to nitrate other guanidine salts and thus increase the yield of nitroguanidine obtainable from the new nitrating cycle.

A further object is to provide a subatmospheric, controlled temperature method for decreasing, in successive stages, the water content of an acid solution containing nitroguanidine; the method being practiced under temperature and vacuum controls interrelated in a manner to safeguard the guanidine residues against decomposition.

Other objects and many of the attendant advantages of this invention will be readily appreciated as the same becomes better understood by reference to the following detailed description.

The herein disclosed process is based upon the following discoveries:

*a.* As the water content of a sulfuric acid residue containing nitroguanidine is lowered by slow distillation, the nitroguanidine hydrolyzes at a correspondingly slow rate, permitting the evolved nitric acid to escape from the solution by easy stages, thus virtually eliminating all danger of explosive decomposition, and at the same time leaving the denitrated guanidine residue in the gradually restrengthened sulfuric acid solution as undecomposed guanidine; the equation for this slow hydrolytic reaction being:

$NH_2C(:NH)NHNO_2 + H_2SO_4 + H_2O \longrightarrow$
(nitroguanidine)
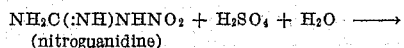
$NH_2C(:NH)NH_2 + H_2SO_4 + HNO_3$
(guanidine)
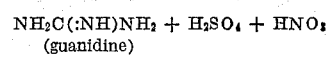

The resulting concentrated sulfuric acid, with its guanidine component, can then be used as a nitrating medium for more guanidine sulfate in a new nitrating cycle, to increase the yield attributable to such new cycle.

*b.* Un-nitrated guanidine salts present in the diluted sulfuric acid are not readily hydrolyzed at moderate temperatures and subatmospheric pressures, consequently they may also be effective to increase the yield in a new nitrating cycle, if added thereto.

c. As a diluted sulfuric acid solution containing nitroguanidine is gradually concentrated by dehydration, some of the nitroguanidine breaks down to form cyanamide and amonium salts, and these react in the restrengthened sulfuric acid vehicle to produce guanidine; the equation series being as follows:

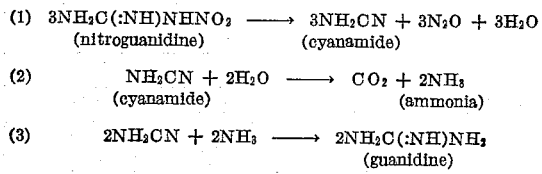

Utilizing these discoveries, the process herein disclosed and claimed involves the progressive reduction of the water content by applying moderate heat to the spent sulfuric acid solution, while simultaneously subjecting it to a subatmospheric pressure of 25 to 50 millimeters of mercury. For this purpose the solution is placed in a flask equipped with a thermometer, a capillary bubbler, and a condenser connected to a water aspirator having the relatively high vacuum capacity just referred to.

In one trial application of the process the temperature of the flask was slowly raised over a period of 3 hours at such a rate that at no time was there any tendency toward decomposition of the guanidine compounds present. At the end of this 3 hour period, the water content had been reduced from an initial 55.5% to a final 45.7%, yet the temperature level had risen to only 53 degrees centigrade. The dehydrating-denitrating action was allowed to continue for 2 more hours, during which time the temperature was raised slightly, to a maximum of 60 degrees centigrade. The water content dropped to 33% during this second stage of the process. In the following 2 hour stage (the third stage) the temperature reached 70 degrees centigrade with still no appreciable decomposition. Through several successive stages totaling about 10 hours in duration the temperature was raised to a final temperature of 150 degrees centigrade, the pressure was reduced to 5 millimeters, and the water content was reduced to a point of almost complete dehydration. The final acid concentration contained 1% water, 56.8% ammonium disulfate, and 42.2% sulfuric acid. Analysis of the mixture revealed a 12% guanidine sulfate content. The successive reactions are summarized in the following equation:

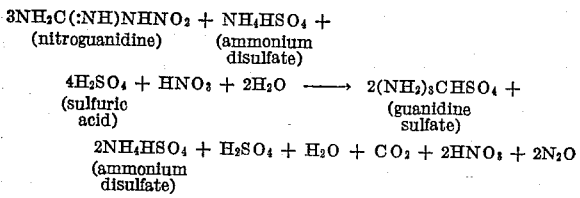

By recycling this final acid concentration containing the indicated guanidine compound, that is, by adding it to a new nitration cycle, the nitroguanidine yield for the new cycle was increased by ten percent.

Obviously many modifications and variations of the present invention are possible in the light of the above teachings. It is therefore to be understood that within the scope of the appended claims the invention may be practiced otherwise than as specifically described.

What is claimed is:

1. The method of recovering guanidine sulfate from spent sulfuric acid residue resulting from the nitration of guanidine sulfate with concentrated sulfuric acid and concentrated nitric acid which includes the steps of progressively heating the spent sulfuric acid residue to 53° C., then from 53° C. to 60° C., and finally from 63° C. to 70° C. over a period of seven hours in a reduced pressure varying 25 mm. of mercury to 50 mm. of mercury to effect substantial dehydration of the residue whereby guanidine compounds in the residue are preserved undecomposed as guanidine salts for recycling with more guanidine salts in a new nitration cycle.

2. The method of recovering guanidine from a sulfuric acid residue containing nitroguanidine resulting from the nitration of guanidine sulfate with concentrated sulfuric acid and concentrated nitric acid which includes the steps of heating the residue in successive stages first to 53° C., then from 53° C. to 60° C., and finally from 60° C. to 70° C. over a period of seven hours in a reduced atmosphere of from 25 mm. of mercury to 50 mm. of mercury, and further progressively heating the residue from 70° C. to 150° C., and progressively reducing the pressure of from 25 mm. to 50 mm. of mercury down to an atmosphere of 5 mm. of mercury whereby said nitroguanidine hydrolyzes slowly to allow evolved nitric acid to escape said residue without explosion and denitrated guanidine residue remains in solution with the dehydrated sulfuric acid solution as undecomposed guanidine salts for recycling with more guanidine salts in a new nitration cycle.

3. A method for increasing the yield of nitroguanidine resulting from nitration of guanidine salts which comprises the steps of precipitating the nitroguanidine product from the residue of compounds created by the nitration reaction, and progressively heating the residue slowly first to 53° C., then from 53° C. to 60° C., then from 60° C. to 70° C., and finally from 70° C. to 150° C. over a period of at least seventeen hours, and progressively reducing the atmosphere of from 50 mm. of mercury to 5 mm. of mercury during said period whereby guanidine compounds in the residue are preserved undecomposed as guanidine salts for recycling with more guanidine salts in a new nitration cycle.

4. In a method for recovering guanidine from the nitroguanidine present in dilute sulfuric acid residue resulting from the nitration of guanidine sulfate with concentrated sulfuric and nitric acids; the steps of progressively heating the residue first to 53° C. for three hours, then from 53° C. to 60° C. for two hours, then from 60° C. to 70° C. for two hours, each preceding heating being conducted in a reduced atmosphere of from 25 mm. to 50 mm. of mercury, and finally progressively heating the residue from 70° C. to 150° C. for ten hours while progressively reducing the pressure from 25 mm. to 50 mm. of mercury down to 5 mm. of mercury whereby guanidine compounds in the residue are preserved undecomposed as guanidine salts for recycling with more guanidine salts in a new nitration cycle.

References Cited in the file of this patent
UNITED STATES PATENTS
2,318,577    Ashley ---------------- May 11, 1943
FOREIGN PATENTS
606,901    Great Britain ---------- Aug. 23, 1948